United States Patent
Harvey

(10) Patent No.: US 9,493,158 B2
(45) Date of Patent: Nov. 15, 2016

(54) METHODS AND DEVICES FOR SAFE OPERATION OF UNDERSIZE AUTONOMOUS VEHICLES ON PUBLIC ROADS

(71) Applicant: Thomas Danaher Harvey, Rockville, MD (US)

(72) Inventor: Thomas Danaher Harvey, Rockville, MD (US)

(*) Notice: Subject to any disclaimer, the term of this patent is extended or adjusted under 35 U.S.C. 154(b) by 0 days.

(21) Appl. No.: 14/967,805

(22) Filed: Dec. 14, 2015

(65) Prior Publication Data
US 2016/0096525 A1    Apr. 7, 2016

(51) Int. Cl.
*B60W 30/09* (2012.01)
*B60Q 1/26* (2006.01)
*G05D 1/00* (2006.01)

(52) U.S. Cl.
CPC ............ *B60W 30/09* (2013.01); *B60Q 1/2611* (2013.01); *B60Q 1/2657* (2013.01); *B60W 2550/30* (2013.01); *B60W 2710/30* (2013.01)

(58) Field of Classification Search
CPC ........... B60W 30/09; B60W 2550/30; B60W 2710/30; B60Q 1/2657; B60Q 1/2611
USPC .................................................. 701/22–27
See application file for complete search history.

(56) References Cited

U.S. PATENT DOCUMENTS

| | | | | |
|---|---|---|---|---|
| 2007/0008140 A1* | 1/2007 | Saarisalo | ............ | G06K 7/0008 340/572.7 |
| 2011/0079969 A1* | 4/2011 | Amlie | ............... | B60G 17/018 280/6.159 |
| 2011/0266076 A1* | 11/2011 | Morey | ................. | B62D 55/06 180/9.32 |
| 2012/0083960 A1* | 4/2012 | Zhu | .................... | G05D 1/0214 701/23 |

* cited by examiner

*Primary Examiner* — Redhwan K Mawari
*Assistant Examiner* — Rodney P King

(57) ABSTRACT

A miniature autonomous vehicle for operation on the public roads is disclosed. The small size allows efficiency for small payloads, but produces a danger of being overlooked by other vehicles. The size of the vehicle is less than driver operated vehicles and may be restricted to less than 200 pounds. Sensors determine the vehicles speed and the presence of environmental vehicles and use a processor to calculate the need for additional visibility. A visibility structure and support structure with lights or markers is controlled by the processor. The markers are controlled in their operation or position by the processor on the basis of the sensor data. Extending or raising and retracting or lowering the structure affects the air resistance and stability of the vehicle. The structure can be raised when the vehicle stops or is in traffic and lowered at road speeds in light or absent traffic.

12 Claims, 9 Drawing Sheets

METHODS AND DEVICES FOR SAFE OPERATION OF UNDERSIZE AUTONOMOUS VEHICLES ON PUBLIC ROADS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Field of the Present Invention

The field of the present invention is autonomous vehicle design and design for vehicles for use on public roads.

Field of the Present Invention

Background Concerning the Need for the Current Invention

Several companies have produced and tested autonomous or driverless vehicles for use, including on public roads. These autonomous vehicles will become commonplace in the near future and new uses will develop. They can offer efficiency in delivery since they eliminate the expense of hiring a driver. To maximize adept maneuvering and to save on fuel and other costs, such serviceable vehicles may be made smaller.

A very small vehicle can accomplish the mission of transporting documents or compact goods, yet potentially be unsafe to operate in ordinary traffic because it may be overlooked by drivers or undetected by sensors installed in either human operated or autonomous vehicles. Collisions could be frequent. The challenge of safely and legally operating extremely small vehicles in their working environment must be addressed. One answer is the addition of structures, signs or visual displays that make the small vehicle sufficiently visible to operate on public roads without adding excessive weight.

What is the situation today regarding size? Small scooters and miniature motorcycles are usually forbidden on most roads. While some cars have smaller heights and weights than usual, the space required for a human operator limits the miniaturization of the vehicle. In addition, human powered vehicles such as bicycles have a limited maximum speed by law which reduces the problem of visibility of a fast approaching vehicle. What is the situation today regarding visibility? Devices such as turn signals and brake lights in cars and trucks are usually at or above eye level or otherwise perceptible to a driver.

Current Technologies Related to the Current Invention

Autonomous vehicles are being produced and tested by several companies. They are able to operate on the public roads without human intervention.

Sensors, actuators, device controllers, data processing devices and software to organize their interactions are highly developed, generally available and documented for use by designers in any technology requiring them for development of a particular application.

There are many developed type of signs and visual displays and supports for them which are generally available.

Patent Publication to be Incorporated by Reference

U.S. Pat. No. 9,139,199 to Harvey published Sep. 22, 2015 is incorporated herein by reference in its entirety. Furthermore, where a definition or use of a term in a reference, which is incorporated by reference herein, is inconsistent or contrary to the definition of that term provided herein, the definition of that term provided herein applies and the definition of that term in the reference does not apply.

BRIEF SUMMARY OF THE INVENTION

Disclosed is an autonomous, unmanned or driverless vehicle that may be limited in size to less than 200 pounds and designed to travel on public roads. It features an elevated structure with visible elements or markers that are controlled by a data processing device which has sensors to detect other vehicles—their presence, speed and other relevant factors. It features a means to modify the visibility of the markers based on the presence of other vehicles and the speed of this (invented) vehicle. There also may be a support structure that raises the visibility elevated structure above the vehicle to make it more noticeable.

The claimed vehicle is further restricted in various claims. In one case, the visibility structure is moved into a position of reduced air resistance by the data processing device on the basis of the data from the sensors. In another case, the height of the center of gravity is changed by moving the elevated structure. This makes the vehicle more stable. In another case, the vehicle chassis is less than 24 inches in height which necessitates the augmented visibility. In other cases, the markers may be lights, electronic displays, or portions of the elevated structure.

The invention also includes a system for operating a driverless vehicle in ordinary traffic on public roads. It includes a structure with an extended and a retracted position. The visibility of the vehicle is increased when the structure in the extended position. The air resistance is reduced when the structure is in the retracted position. A processor controls the movement of the structure as it determines and assesses the vehicle's operating environment.

In various claims this system is further restricted to a vehicle with (a) a minimum of two additional square feet of visible structure above 36 inches from the ground, (b) with less than two square feet visible when retracted, and (c) with marker or visibility structure controlled by a processer and sensors from data comprising speed or presence of another vehicle.

The invention also includes a method of avoiding accidents by operating a vehicle as described above, running a program on the processor to detect vehicles in the operating environment, and modifying the visibility of the markers based on the presence and speed of another vehicle. The additional restrictions described above are applied in other claims to the method of this paragraph.

BRIEF DESCRIPTION OF THE SEVERAL VIEWS OF THE DRAWING

The features and advantages of the various embodiments disclosed herein will be better understood with respect to the drawing in which.

DETAILED DESCRIPTION OF THE INVENTION AND EMBODIMENTS

Definitions

Figure 1:
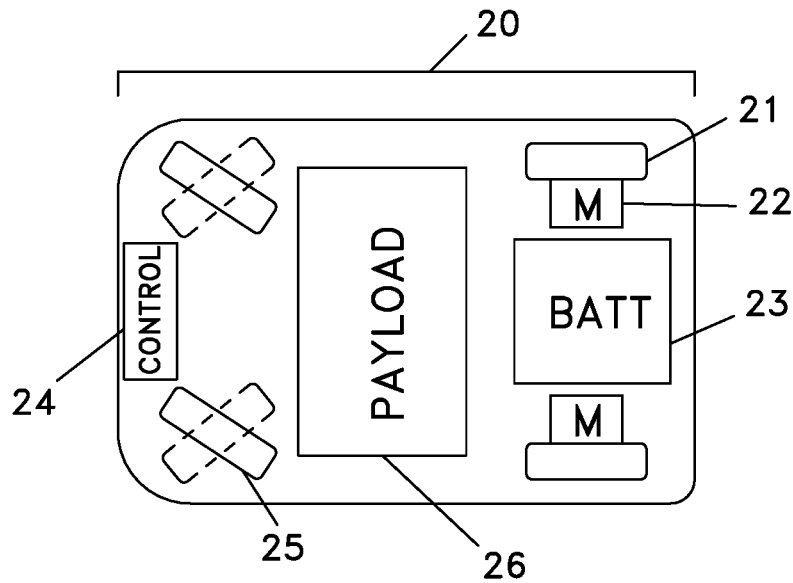
FIG. 1 is a plan view of a simple autonomous miniature vehicle.

MiniAV is a term used in this disclosure for an autonomous vehicle designed and adapted for use on the public roads for which the base vehicle is substantially smaller than conventional driver operated vehicles.

A vehicle configured for use on the public roads is one which has structural details designed and adapted to conform with the legal and operational requirements of such use. It is designed to operate in ordinary automobile and truck traffic as regulated by governmental authorities and is not restricted to off-road or privately controlled areas of operation.

A compete vehicle includes the base vehicle and any visibility system and any support system for a visibility system.

An environmental vehicle is another vehicle which is nearby. It includes both vehicles to which the visibility system and markers are directed and vehicles which have a potential effect on the safety and navigation of the miniAV. Environmental vehicles may be driver operated or autonomous.

A vehicle chassis includes the base vehicle itself (referenced as 20 in the various figures), the payload and power systems but excludes any visibility structure or support structure for a visibility structure.

A visibility structure is a part of the miniAV designed to carry markers and be elevated above the chassis.

A support structure is a part of the miniAV designed to elevate a visibility structure above the chassis. It may be comprised of the lower part of the visibility structure. Low air resistance for a support structure is relative the air resistance of a larger chassis which would provide the same height for the visibility structure.

Components of a MiniAV with Visibility and Support Structures

The chassis of a miniAV is designed for efficient operation as an autonomous vehicle. It's comprises the motive power, control circuits and equipment, and the components needed for road operation such as wheels and steering components. The payload is typically carried on or in the chassis. The size and weight is limited by considerations of efficiency in cost of vehicle, energy use and other cost and environmental factors.

There is a need to deliver payloads of all sizes from small items such as documents for repair parts, through medium items such a grocery orders to larger items requiring full size vehicles. This implies that miniAVs would be required from as small a size as can be safely operated on public roads up to sizes that blend into conventionally sized vehicles. Experience with mass produced remote controlled cars indicates that reasonable ranges can be achieved with vehicles as small as 2 pounds so the effective small limit is the mechanical ability to operate autonomously on roads with defects such as steel plates and potholes. Less sophisticated controls which may not avoid road defects would require a vehicle of about 50 pounds but more sophisticated controls may allow much smaller vehicles.

The upper limit of miniAV size is approximately 200 pounds because a vehicle of more than that weight is large enough to be seen in operation by other vehicles. This is approximately the weight of a moped with a small driver which is the smallest conventional vehicle allowed in ordinary traffic in most places. For efficiency and stability, a vehicle of this size would benefit from a reduced height of less than approximately 24 inches for the chassis component. Visibility and support structures above this height would be of limited weight and air resistance and in many cases movable to lower heights.

The visibility structure increases the visible size of the vehicle by extending into the line of sight of environmental vehicles. To accomplish this purpose, it must be a substantial distance above the ground and in the current invention be elevated above the chassis. The weight and air resistance of the visibility structure is limited to increase the energy efficiency of the vehicle and the resistance to overturning from road hazards.

The height zone from about 36 to 60 inches above the ground is critical for visibility of vehicles and their visual recognition. This is because common small automobiles are about 60 inches tall and the eye level of a motorcycle or motor scooter driver is about 60 inches. Common blocking structure such as traffic cones and barrels are about 36 inches in height. A standard full size stop sign is required to be a octagon measuring 30 inches across with a surface area of about 6 square feet. As stop sign is an example of a sign with a requirement for being noticed as a primary safety consideration. Thus, it should be larger than signs that merely convey information. Ideally, a visibility structure to be effectively seen should introduce 6 square feet of visible surface from a critical direction above 36 inches from the ground. A smaller area would be more economical but structure of less than two square feet would be substantially less effective.

The visible markers of the visibility structure are those devices, components or features of the visibility structure which serve to be seen, detected or noticed by environmental vehicles. There are many kind of markers available in miniAV designs. The most basic is the surface of the visibility structure which may be made distinctive with paint, reflective patches or other surface treatments. Other markers include lights, display panels, reflectors, moving surfaces, and printed words or pictures.

A data processing device is used to control the markers. This device can be located in the miniAV or remotely. It can be a separation process or function of a data processing device with other functions such as the general operation of the miniAV. It uses data from sensors to determine the situation of the miniAV and of environmental factors including environmental vehicles. It uses this information to control some or all of functions including deployment or position of the visibility structure and visibility and operation of the markers.

A sensor or group of sensors is used to detect environmental vehicles. The raw data from the sensor or sensors is processed as necessary and grouped with other factors to make a determination of the current and possible projected situation with respect to environmental vehicles. The sensor can use any appropriate technology to detect the environmental vehicles. These technologies include radar, LIDAR, passive detection of electromagnetic waves of any frequency, active and passive sonar, receipt of transmitted signals. The sensors can be located on the miniAV or be in other places with data being communicated to the miniAV processor.

The environment in which a vehicle operates includes nearby objects or vehicles which are sensed, the configuration of the road as either sensed, retrieved from an information store or communicated from another system. It also includes the parameters of the current vehicle such as the current speed.

Autonomous vehicles as a part of their operations sense vehicles around them and develop sophisticated analyses of situations concerning these vehicles for use in the detailed operation and navigation of the vehicle. When such information is passed from the processor or process in a processor of the vehicle control to the control processor for the markers or visibility structure that is herein deemed to be data from a sensor of environmental vehicles and can be used in determining functions, actuation or positioning of markers and the visibility structure.

A sensor or group of sensors is used to detect the speed of the miniAV. This can be either the speed over the ground or the relative speed of the miniAV to some other vehicle or object. The raw data from the sensor may be processed by a processor to determine the speed. If a device controlling the operation of the miniAV produces data or a signal to control the speed of the miniAV, that device functions as a speed sensor and the data or signal can be used as a sensor by the data processing device controlling the markers. Similarly, information defined by the speed of the vehicle by a vehicle operating processer can allow that processor to function as a sensor to the marker or visibility control processor.

A processor to modify the position or visibility of the markers or visibility structure as a function of the sensor data would require a suitable program or algorithm. The algorithm would comprise several steps:

(1) Gathering information from the speed and vehicle presence sources or sensors.
(2) Processing the information to determine vehicle speed and presence of other vehicles from the raw sensor date.
(3) Evaluating the need for visibility from the processed sensor data. This could be accomplished by evaluating a predetermined or generated model of danger as a function of the input conditions.
(4) Outputting a determination for use by actuators or controllers.

Various means to modify the visibility of the markers are provided in various embodiments. One is to move the visibility structure from a retracted position, where it provides improved air resistance, road stability, center of gravity height, efficiency or safe speed to the vehicle, to an extended position. In the extended position the markers are more visible because they are exposed or placed at a greater height from the ground. Another means is to turn on, blink or flash markers which comprise lights. Still another means is to operate, flash or change the contents of an electronic display. Some modifying means for marker visibility involve moving substructures of the visibility structure. Markers which are visible components can be deployed, exposed, waved, moved, aimed, uncovered or extended by mechanical actuators under the control of the data processing device. The means of modifying the visibility of markers includes the whole variety of technologies and devices which actuate, energize, program, or communicate with markers for that purpose.

The modification of marker visibility can be a function of the presence of other vehicles or the speed of the miniAV in various ways. The information creating the functional relationship can be gathered by sensors or sources that are nearby and directly connected or remote and transmitting the information over any type of communication channel. The information may be processed, changed, augmented or limited as long as the final result at the maker or visibility structure depends on the condition of presence or speed.

Various embodiments use the means of modification as a function of the determination of the presence of one or more other vehicles and of the speed of the miniAV.

In various embodiments a support structure connects the chassis with the visibility structure. This may be distinct from the visibility structure, but it can also be merely the bottom part of the visibility structure itself. It raises the visibility structure sufficiently that markers are placed into the field of vision of environmental vehicles or their drivers. Because most conventional street vehicles are at least 40 inches high including the driver in the case of open vehicles and because many obstacles are about that height, markers should be raised at least 40 inches from the ground. The support structure should provide the spacing with air resistance substantially less than a chassis of corresponding height.

An additional function of the support structure in some embodiments is to raise and lower the visibility structure for the purpose of increased visibility in the high position and decreased center of gravity in the lower position. In situations where enhanced visibility is not necessary the lower center of gravity would make the vehicle more stable at high speeds and resistant to overturn. The center of air resistance would also be lowered, which also contributes to road stability. This allow higher speeds to be safely used away from other vehicles.

The operational procedures and configuration of a MiniAV may be different at road speeds and at stopping points. The visual structure can be retracted wholly or partially in order to improve the structural and aerodynamic properties of the complete vehicle. This improves the stability and economy of the vehicle in the situations where air resistance and resulting energy use, being proportional respectively to the square and cube of the speed, are maximized. The extended visibility structure in slow speed or resting positions provides visibility in the situations were that is needed.

Autonomous vehicles being equipped with sensors or systems to be aware of surrounding vehicles and information processing systems can evaluate the need to extend the visibility system in particular situations. The actual extension in situations where the vehicle is moving at a substantial speed should be limited to speeds and degrees of extension that are determined to be stable, safe and not damaging to equipment.

Autonomous vehicles can use sensors to gather information about surrounding vehicles and energize specific lights or other awareness devices associated with the visibility structure in situations where a higher probability of unsafe interactions with surrounding vehicles are more probable.

DETAILED DESCRIPTION OF THE DRAWING AND CERTAIN EMBODIMENTS

Figure 2:
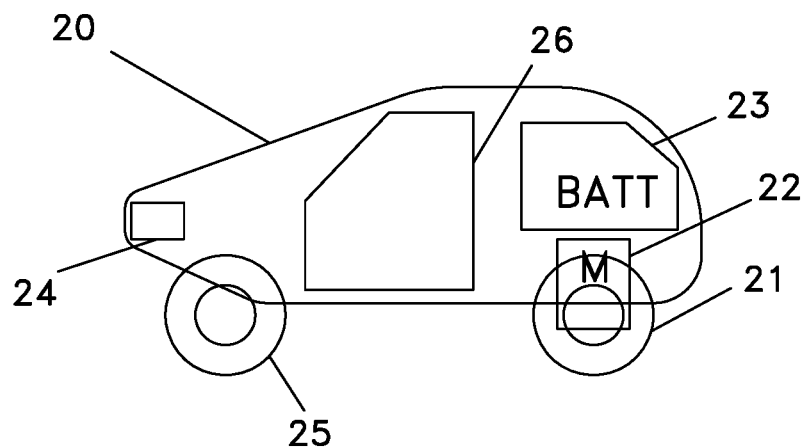
FIG. 2 is a side view of a simple autonomous miniature vehicle.

FIG. 1 is a plan view of a simple autonomous miniature vehicle with only the chassis component 20 from a simple and preferred embodiment of the current invention. The envisioned vehicle is approximately 4 feet in length, 3 feet in width and 24 inches in total height. It weighs about 150 pounds without payload. This is sufficiently large to operate at normal public road speeds and carry a reasonable payload with extremely efficient energy use. Drive wheels 21 are powered by individual motors 22 working from the energy of a battery 23. Control devices for autonomous operation 24 control both the drive motors and the steerable wheels 25. A payload 26 is placed in a center compartment for transfer. FIG. 2 shows a side view of the vehicle of FIG. 1 showing the same components.

Figure 3:
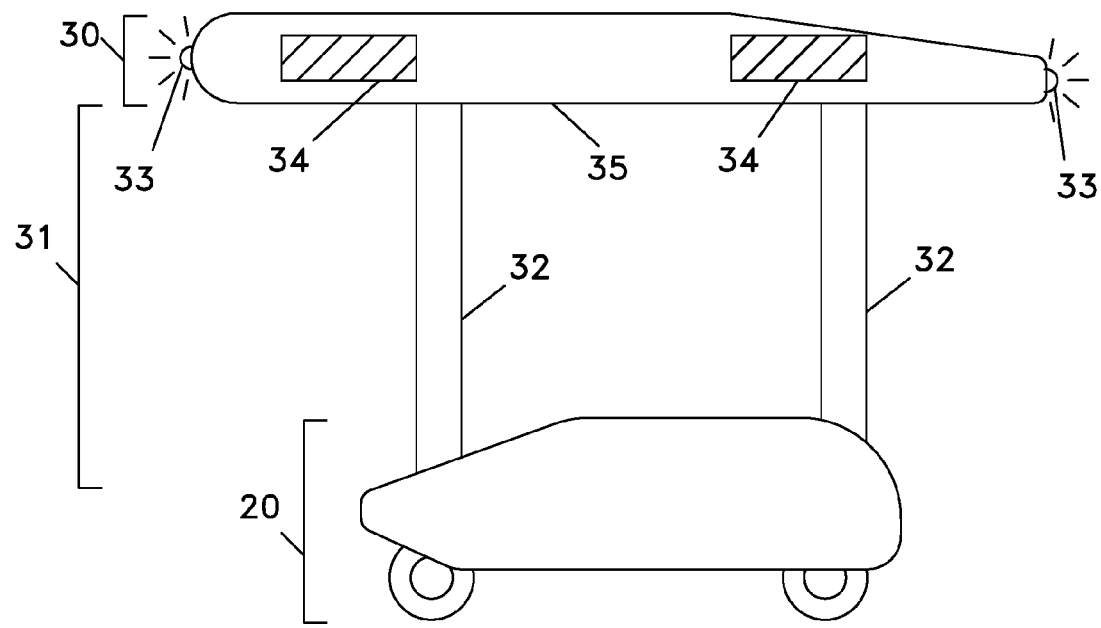
FIG. 3 is a side view of an autonomous miniature vehicle with chassis, visibility structure, and support levels.
Figure 4:
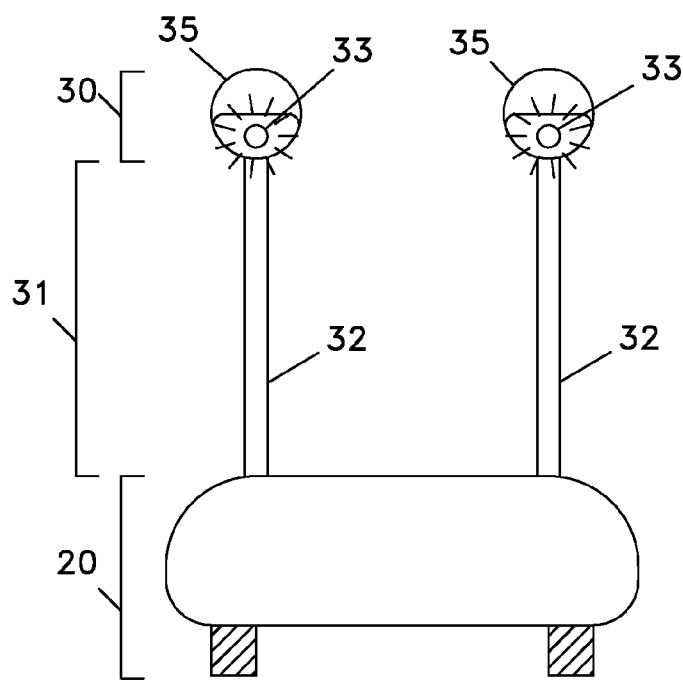
FIG. 4 is a rear view of an autonomous miniature vehicle with chassis, visibility structure, and support levels.

FIG. 3 (side view) and FIG. 4 (rear view) show a complete autonomous vehicle with the three levels envisioned by the current invention. The simple autonomous vehicle or vehicle chassis 20 of FIG. 1 and FIG. 2 has the additional levels of a visibility system 21 and a support system 22. The visibility system consists of two pods 35 with lights 33 on both ends and reflector strips or surfaces 34. The pods are supported by the struts 32 that comprise the support level or system.

Figure 5:
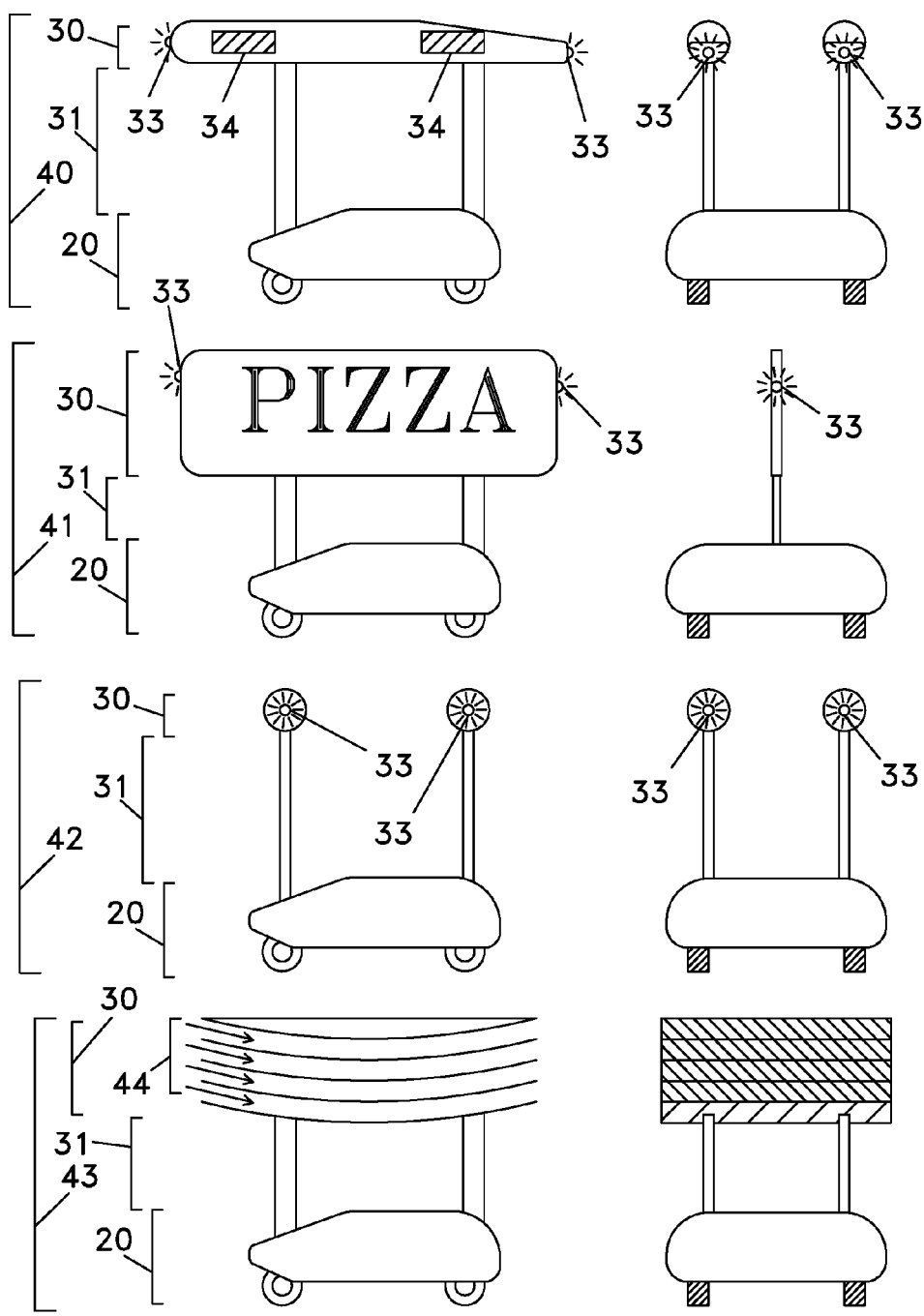
FIG. 5 shows side and rear views of several variations in the visibility structure and support levels.

FIG. 5 shows side views of several different visibility and support systems for a small autonomous vehicle. Each pair of views shows a vehicle chassis level 20, a visibility system level 30 and a support level 31. Most of the systems have visibility lights 33 which are modulated and operated by a data processing device on the basis of a combination of the speed and other conditions of the miniAV and the presence of other vehicles. All of the visibility systems have a support level or device 31 which could be designed to actively move and raise and lower the visibility system or level on the basis of determinations of a data processing device connected to sensors for speed or other miniAV conditions and vehicle presence or other environmental conditions.

The first vehicle system 40 has a fixed visibility structure 30 in two parts. It has much less air resistance than a vehicle with a conventional structure of the same height, length and width. The center of gravity is low due the nature of the visibility structure as a warning device made of hollow light weight materials. The visibility lights 33 and reflective tape 34 provide a warning of the presence of the miniAV to other vehicles, especially human driven ones.

The second vehicle system 41 has a single thin visibility structure and support. This allows for high visibility from the sides and very low air resistance to forward motion. The sign shown is for advertising showing a way to share the function of high visibility with another purpose. The advertising could be an electronic display which shows advertising until the data processing device of the miniAV The display could replace the advertising shown in low risk situations with warnings if deemed appropriate by the control computer based sensory data.

The third vehicle system 42 shows the support and visibility structures reduced to minimal sizes. They could fold down or back for reduced air resistance at higher speeds or when away from other vehicles.

The fourth vehicle system 43 is an implementation for use where passive opacity is required with low air resistance. The open slots allow airflow through the structure for reduced air resistance, but the curvature prevents direct vision through the structure.

Figure 6:
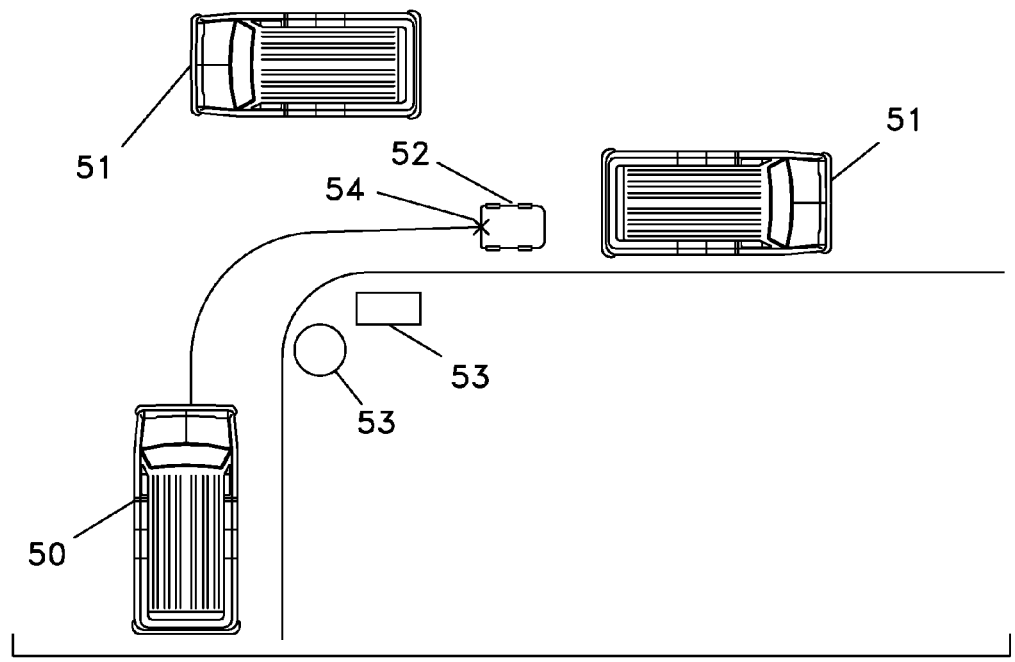
FIG. 6 shows a plan view of a situation where environments objects block view of a simple autonomous miniature vehicle

FIG. 6 shows a situation where the small size of a miniAV prevents the driver of a conventional vehicle from seeing it and avoiding an accident. A conventional vehicle 50 has stopped at a corner, and looks to the right before turning. The drive sees two other conventional vehicles 51 but does not see the miniAV 52. The vision is blocked by two objects 53, one a trash can and the other a newspaper rack. These objects are typically 36 to 40 inches high and do not block visibility of conventional vehicles even if they are directly below the line of vision. The driver of the conventional vehicle turns the corner and hits the miniAV 54. This is the situation to be avoided. A substantial visibility structure is needed because of the high potential for confounding objects. If the visibility is insufficient such accidents will be too frequent.

Figure 7:
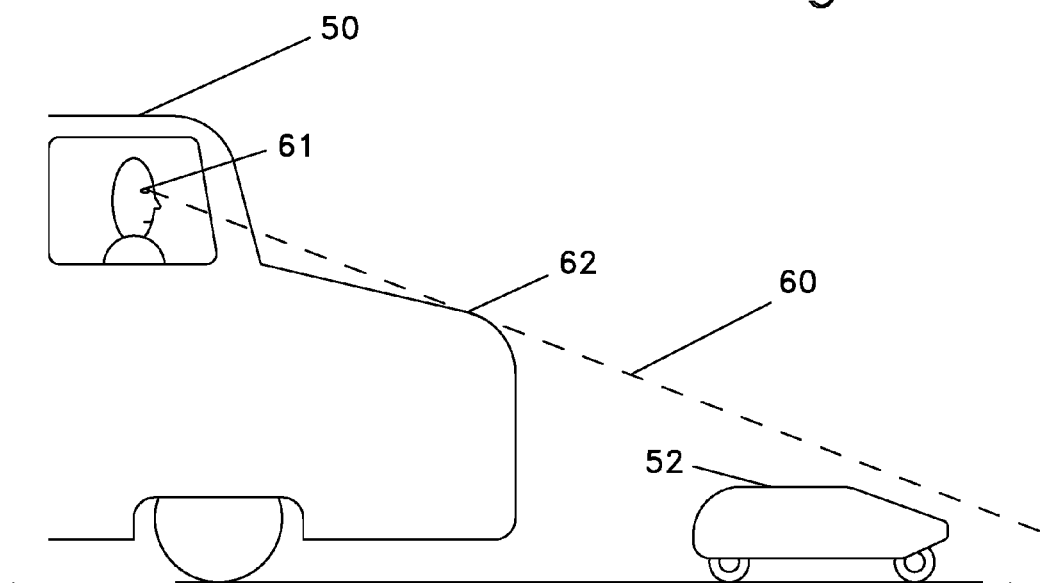
FIG. 7 shows a side view where a simple miniature vehicle is not visible to the driver of a nearby full size vehicle.

FIG. 7 shows a side view of another situation where a miniAV may be overlooked by a conventional vehicle driver. A conventional vehicle 50 is stopped behind a miniAV 52. The line of sight 60 from the driver's eye 61 is blocked by the hood 62 of the conventional vehicle and the driver, who may have barely noticed the miniAV, forgets it is there. As a traffic light changes from red to green the conventional vehicle starts off quickly and strikes the miniAV.

Figure 8:
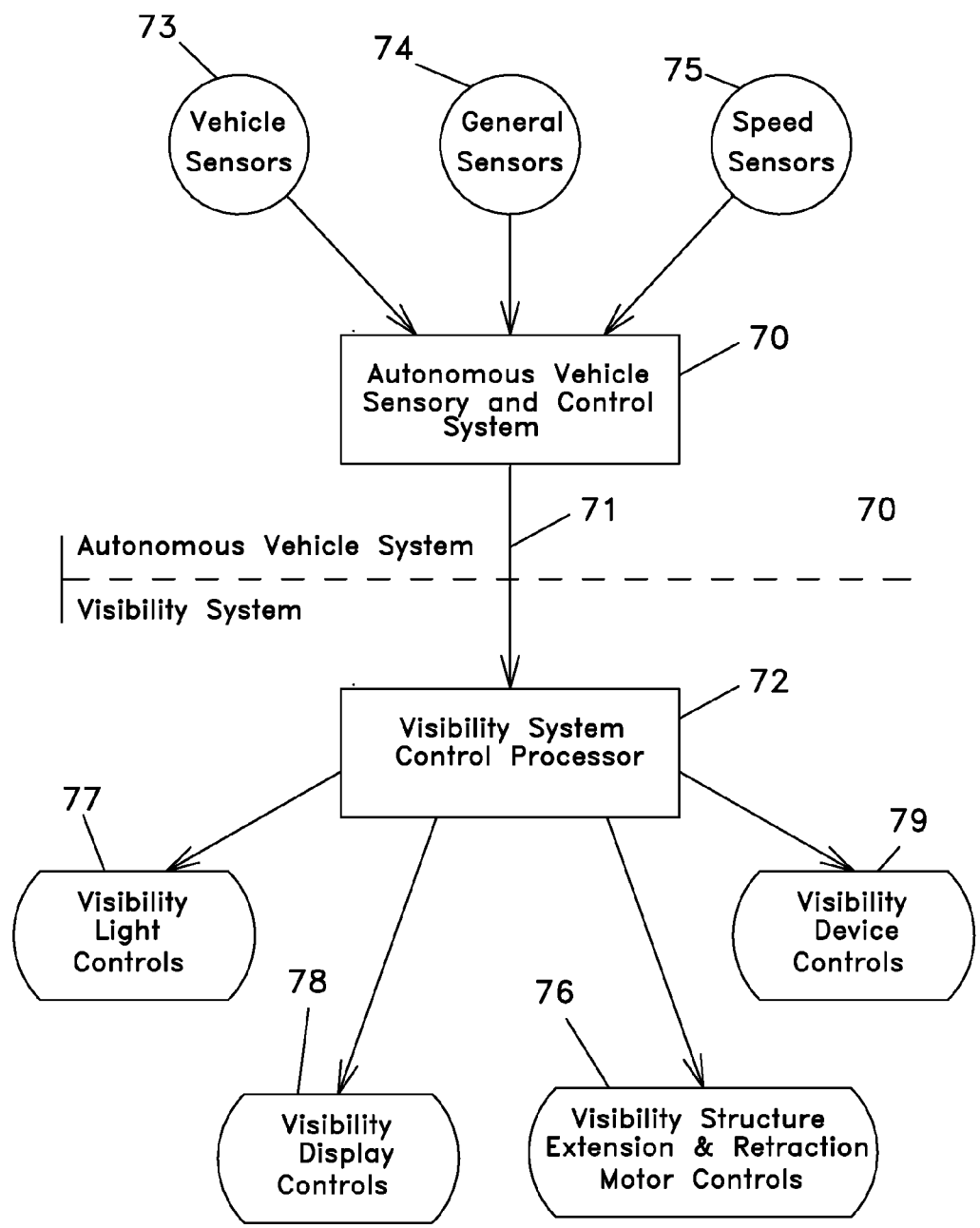
FIG. 8 is a diagram of control devices of an autonomous vehicle with control of visibility structure and support.

FIG. 8 shows a diagram of the operation of a control system for a miniAV with a controlled visibility structure. The vehicle itself, also called the chassis, is controlled by a system 70 designed to control such vehicles. In the embodiment diagrammed this is shown as being separated from controls for the visibility system except for a shown and defined communication link 71. The AV control system 70 has attached sensors for nearby and other environment vehicles 73, vehicle speed 74 and general external and internal conditions 75. In many cases sensors needed for the operations of the vehicle autonomously are sufficient to control the operations of the visibility module; and there is no need for additional special purpose sensors. The autonomous vehicle data processing system can correlate this information and provide processed and interpreted data for the visibility system.

The visibility system has a control processor 72 which receives reported information which can include presence of nearby or approaching vehicles and their relative locations and situations. The visibility system processor makes decisions concerning deployment and operation of the visibility structure and its associated lights, displays and devices. The structure or appropriate substructures is extended or retracted by actuators or motors controlled by included motor controls 76. Specific visibility can include lights controlled by a light control 77, electronic displays controlled by a suitable controller 78 or other devices with a controller 79.

The system shown in FIG. 8 has separate processors connected by a communications link for the autonomous operation of the vehicle and the visibility system; but it would be convenient in many designs to combine the functions in a single processor. The two functions could be separate processes in an operating or supervisory system running on the processor communicating by a facility of the operating system.

Figure 9:
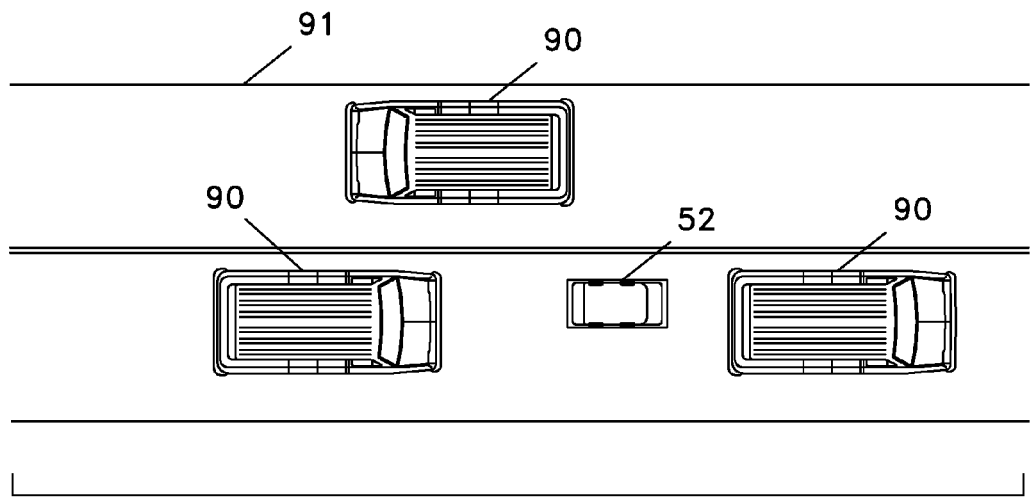
FIG. 9 is a plan view of operation of a miniature autonomous vehicle in traffic with visibility on and structure extended.
Figure 10:
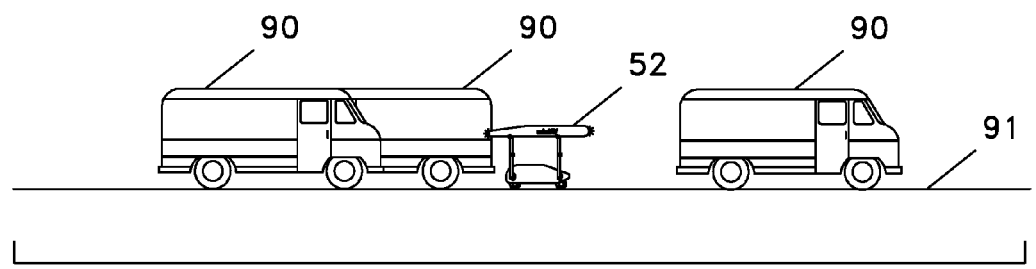
FIG. 10 is a side view of operation of a miniature autonomous vehicle in traffic with visibility on and structure extended.

FIG. 9 shows a plan view of a miniAV operating on a road with traffic. FIG. 10 shows the same situation from a side view. The miniAV 20 is shown on a two lane road 91 with a substantial presence of environmental vehicles 90 which may be conventional as shown or autonomous. It should be noted that visibility is not just for the benefit of environmental driver operated vehicles; other autonomous vehicles, perhaps large ones, also may require line of site detection of the miniAV for safety. As shown in FIG. 10 the visibility structure is extended under these conditions.

Figure 11:
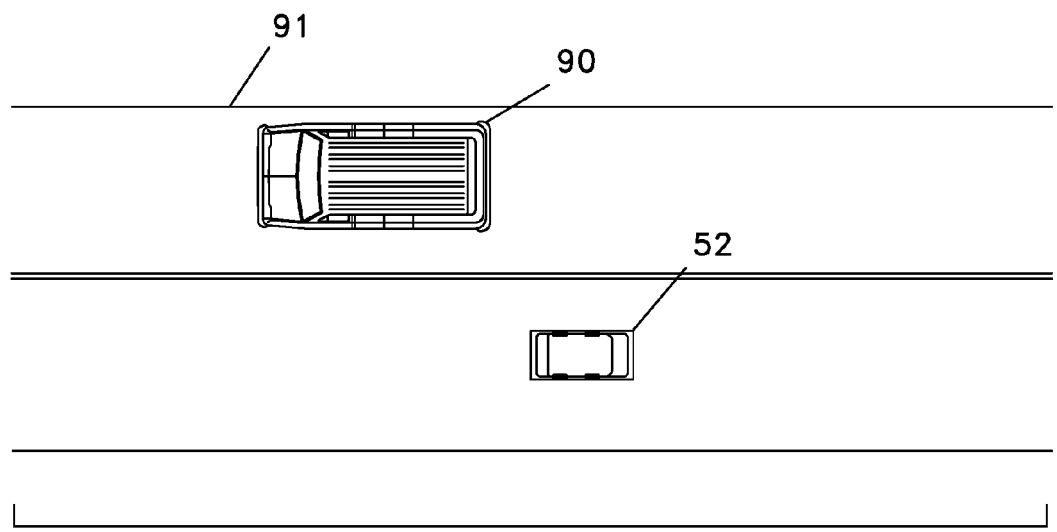
FIG. 11 is a plan view of operation of a miniature autonomous vehicle without traffic with visibility markers off and structure retracted.
Figure 12:
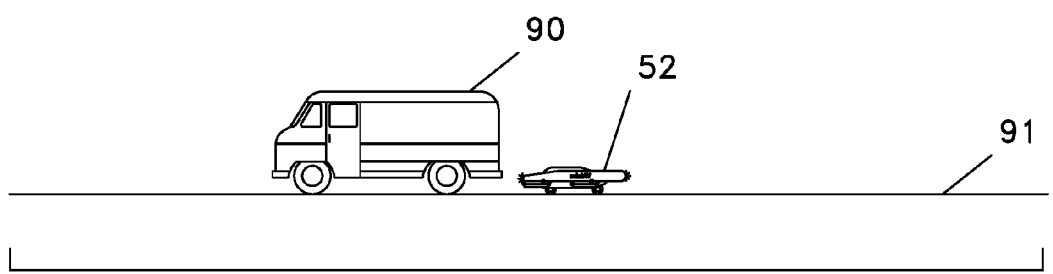
FIG. 12 is a side view of operation of a miniature autonomous vehicle without traffic with visibility markers off and structure retracted.

FIG. 11 shows a plan view of a miniAV operating on a road without traffic going in the same direction. FIG. 12 shows the same situation from a side view. The miniAV 20 is shown on a two lane road 91 with only one environmental vehicle 90. Because that vehicle is traveling in the opposite direction and in a lane bound in the opposite direction, the data processing device of the miniAV has deemed it unnecessary to raise the visibility structure. As shown in FIG. 10 the visibility structure is retracted under these conditions. The miniAV is assumed to use its sensors to analyze the situation. Because a larger visibility structure may require time to raise or lower, the decision may be made on a larger time scale than on the basis of one specific situation. Other kinds of visibility devices such as lights may have a fast response and be changed based on vehicle by vehicle determination of the need.

Figure 13:
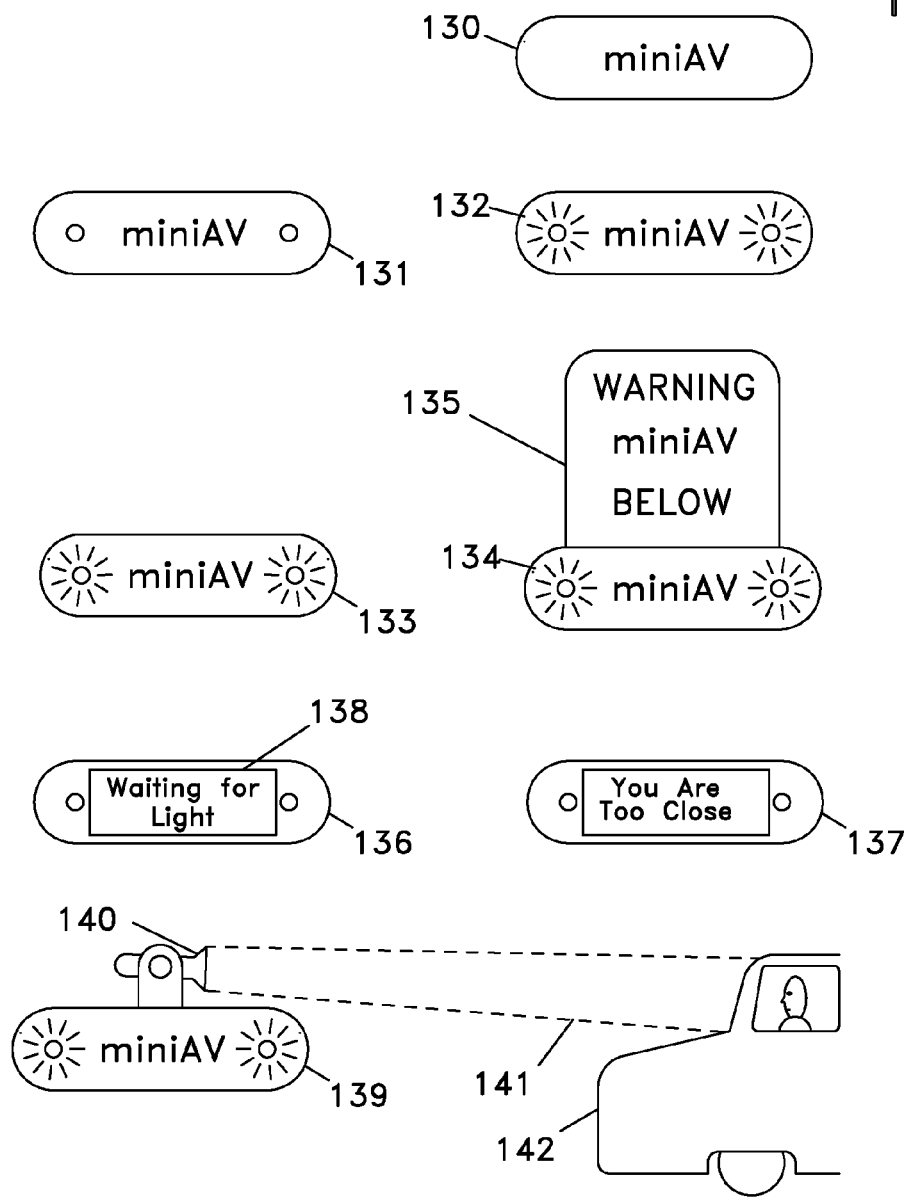
FIG. 13 shows various visibility markers.

FIG. 13 shows various methods of modifying the visibility of markers associated with a visibility structure. The most basic way to do this function is to move the visibility structure or one of its substructures in and out of view. A visibility structure is shown in 130; it is deployed or extended because it is visible; the corresponding retracted structure is not shown because in this case it is not visible. The word "miniAV" is shown on its surface as a passive extension of its visible effectiveness. Other such passive extensions could include bright colors, reflective tape and patterns and textures.

Another simple way to modify the visibility of markers is to turn on 132 and off 131 lights on the visibility structure. The controls could do it in response to situations where increased visibility is decided to be put in effect because of conditions such a nearby vehicles or situations with increased danger deduced by sensors. The implemented rules could be as simple as turning on lights when stopped near other vehicles or as complex as emergency "all out" operation when imminent collision is detected. The light may be simply changed when conditions changed or blinked or flashed at different rates. There are many reasons that the light should not be operated in the most conspicuous manner at all times. These include viewer fatigue, communication to surrounding drivers of specific conditions, and the fact that the start of blinking or flashing is more conspicuous than its continuance.

Various substructures of the visibility structure can be controlled. They can consist of items like extendable signs 135 which can be pivoted or telescoped into an extended, deployed and visible position 134 from a retracted position 133. There could also be visible elements that move to attract attention and louvers, gobos or other visibility limiters to allow messages to be directed to specific vehicles.

Electronic display signs 138 are shown with one message 136 and a second message 137. The signs can be controlled on the basis of the situation of the miniAV as in 136 or on the basis of the situation as sensed of environmental vehicles 137. Different signs on different sides of the miniAV or otherwise directed to specific viewers can be differently controlled.

Visible devices can be directed to specific environmental vehicles. A visibility structure 139 is shown with a light 140 that can be directed to an environmental vehicle which need to be warned about the existence of the miniAV. The receiving vehicle 142 has been deemed by the control processor to require a special warning after its existence and situation are found through the use of sensors and the beam 141 is specifically directed for this purpose.

Figure 14:
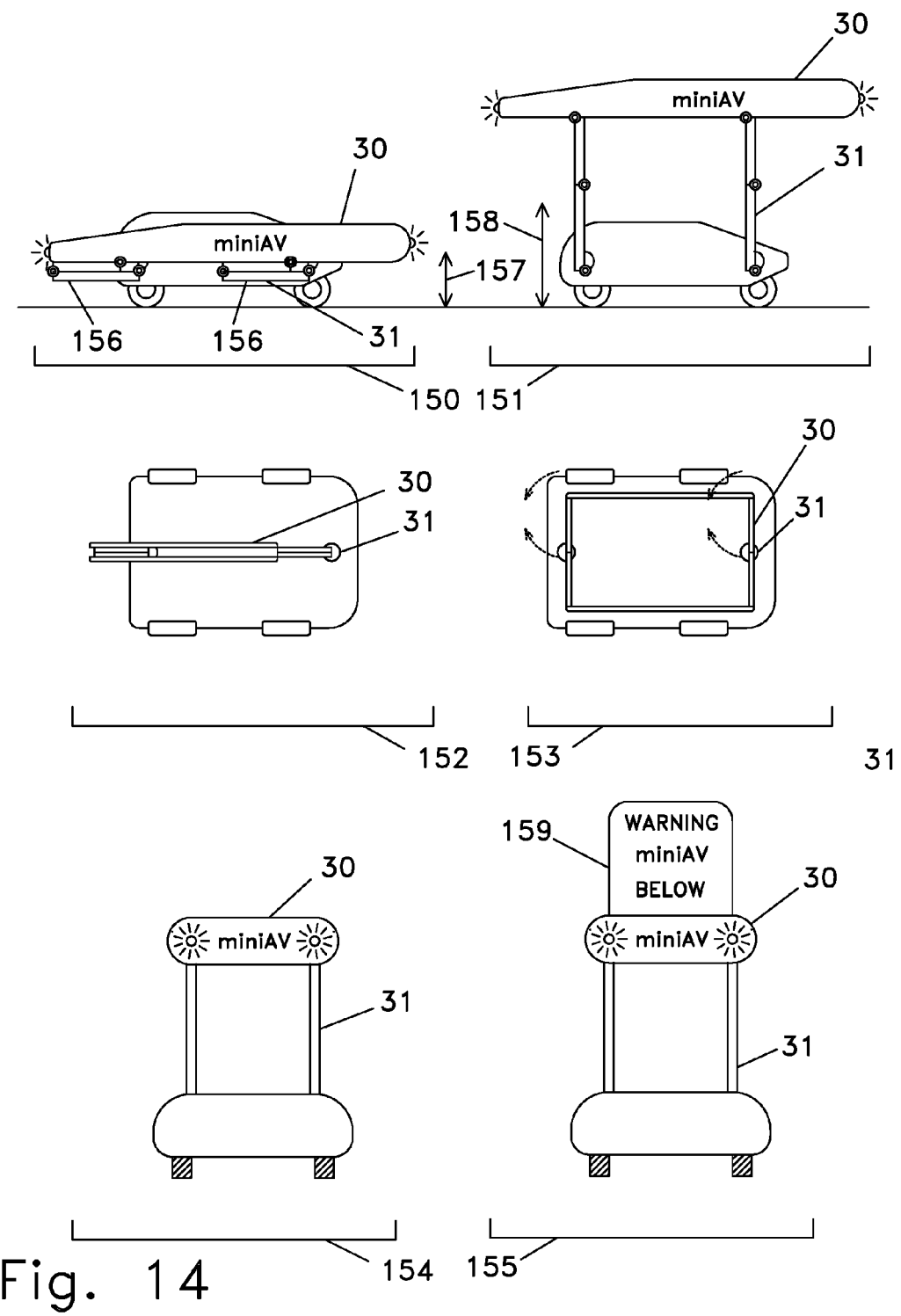
FIG. 14 shows visibility structures in deployed and retracted positions

FIG. 14 shows three variations of miniAVs with different operations to deploy or extend and retract visibility structures and substructures. In each case a visibility structure 30 is shown with a support structure 31.

The first variation shows a visibility structure that is raised and lowered on hinged supports 156; it is shown retracted as 150 and extended as 151. The visibility structure is open in the middle to allow it to lower over the chassis of the miniAV. This reduces the air resistance of the combination by combining the frontal area of the chassis and the support structure. The center of gravity (retracted 157, extended 158) of the combination is greatly reduced by retraction because of the substantial lowering of the support structure.

The second variation shows miniAV with a visibility structure that is folded when away from other vehicles or moving at substantial speeds; the vehicle is shown with the structure retracted as 152 and extended as 153. The panels making up the visibility structure fold back in the retracted position and reduce the frontal area of the combined vehicle and it's air resistance. This allows substantial visibility structures to be displayed in all four directions at low speeds and while the vehicle is stopped, with reduced frontal area when moving.

The third variation shows a miniAV with a flap 159 which can be raised above the main visibility structure; the vehicle is shown with the flap retracted as 154 and extended as 155. The flap is a substructure of the visibility structure which provides increased visibility at low speeds and around other vehicles. It provides reduced air resistance when retracted by either folding back on a hinge or telescoping in multiple sections out of the main visibility structure. If the miniAV is very small several folds or unfolds of the flap may be required to raise it to a sufficient height creating the desired visibility.

I claim:
1. A method of avoiding accidents comprising:
(a) operating a driverless first vehicle on public roads with the vehicle comprising:
a vehicle chassis weighing less than 200 pounds,
an elevated visibility structure with a visible marker controlled by a data processing device with a first sensor to detect a presence of a second vehicle and a second sensor to measure a speed of the driverless first vehicle,
a support structure of low aerodynamic resistance connecting the vehicle chassis and the elevated visibility structure with the elevated visibility structure substantially raised above the vehicle chassis,
a data processing device with a sensor to detect the second vehicle,
(b) running a program on the data processing device to determine the presence of the second vehicle, and
(c) modifying the visibility of the marker as a function of the determination of the presence of a second vehicle.

2. The method of claim 1 wherein:
the visibility structure is moved into a position of reduced aerodynamic resistance by the data processing device as a function of the determination of the presence of the second vehicle.

3. The method of claim 1 wherein:
the height of the center of gravity of the driverless first vehicle is changed by the data processing device as a function of the detection of the presence of a second vehicle.

4. The method of claim 1 wherein:
the first driverless vehicle has a chassis of less than 24 inches in height.

5. The method of claim 1 wherein:
the marker is controlled by the data processing device and is at least one a light and a graphic display.

6. The method of claim 1 wherein:
the marker comprises a portion of the elevated visibility structure which is moved under control of the data processing device.

7. A method of avoiding accidents comprising:
(a) operating a driverless first vehicle with a chassis weighing less than 200 pounds and a visibility structure with a first position and a second position wherein the operation is on public roads and there may be a second vehicle present which is operated by a driver with a line of sight higher than a height of the first vehicle,
(b) using a sensor to determine a presence of the second vehicle,
(c) making the first vehicle visible to the driver of the second vehicle by raising the visibility structure from the first position to the second position wherein the first position is below the line of sight of the driver of the second vehicle and the second position is above the line of sight of the driver of the second vehicle, and
(d) increasing an efficiency of the first vehicle by lowering the visibility structure to the first position when the second vehicle is not present wherein the first vehicle with the visibility structure in the first position is substantially more aerodynamically efficient than the first vehicle with the visibility structure in the second position.

8. The method of claim 7 further comprising:
increasing a stability of the first vehicle by lowering the visibility structure to the first position when the second vehicle is not present, wherein the first vehicle with the visibility structure in the first position has a substantially lower center of gravity than the first vehicle with the visibility structure in the second position.

9. The method of claim 7 further comprising:
increasing a stability of the first vehicle by lowering the visibility structure to the first position when the second vehicle is not present, wherein the first vehicle with the visibility structure in the first position has a substantially lower center of aerodynamic resistance than the first vehicle with the visibility structure in the second position.

10. A method of safely operating a vehicle comprising:
(a) operating a driverless first vehicle on public roads wherein the first driverless vehicle is substantially smaller than human driven vehicles,
(b) making a first determination with a computing device and at least one sensor that there is a risk that the first driverless vehicle will not be seen by a driver of a second vehicle which is a human driven vehicle,
(c) moving a component of the first vehicle with a first position and a second position from the first position to the second position to increase a visibility of the first driverless vehicle to the driver of the second vehicle as a function of the first determination,
(d) making a second determination with the computing device that a risk that the first driverless vehicle will not be seen by the driver of the second vehicle has been reduced from the risk of the first determination,
(e) moving the component as a function of the second determination from the second position to a first position to accomplish at least one of a lower aerodynamic resistance by the first driverless vehicle and a lower center of gravity of the first driverless vehicle.

11. The method of claim 10 wherein:
the first driverless vehicle increases its efficiency with the component in the second position from an efficiency of the first driverless vehicle with the component in the first positon as a result of having a lower aerodynamic resistance with the component in the second position rather than with the component in the first position.

12. The method of claim 10 wherein:
the first driverless vehicle increases its stability with the component in the second position from a stability of the first driverless vehicle with the component in the first positon as a result of having a lower center of gravity with the component in the second position rather than with the component in the first position.

* * * * *